(12) United States Patent
Takahashi

(10) Patent No.: US 8,740,203 B2
(45) Date of Patent: Jun. 3, 2014

(54) CLAMP DEVICE

(75) Inventor: Kazuyoshi Takahashi, Tokyo (JP)

(73) Assignee: SMC Kabushiki Kaisha, Tokyo (JP)

( * ) Notice: Subject to any disclaimer, the term of this patent is extended or adjusted under 35 U.S.C. 154(b) by 143 days.

(21) Appl. No.: 13/499,745

(22) PCT Filed: Mar. 16, 2010

(86) PCT No.: PCT/JP2010/054418
§ 371 (c)(1),
(2), (4) Date: Apr. 2, 2012

(87) PCT Pub. No.: WO2011/040062
PCT Pub. Date: Apr. 7, 2011

(65) Prior Publication Data
US 2012/0193855 A1 Aug. 2, 2012

(30) Foreign Application Priority Data
Oct. 2, 2009 (JP) .................................. 2009-230955

(51) Int. Cl.
*B23Q 3/08* (2006.01)
*B25B 1/14* (2006.01)
*B25B 5/12* (2006.01)
*B25B 1/08* (2006.01)
*B25B 5/08* (2006.01)

(52) U.S. Cl.
USPC .............................. 269/32; 269/228; 269/233

(58) Field of Classification Search
USPC ........................................... 269/32, 228, 233
See application file for complete search history.

(56) References Cited

U.S. PATENT DOCUMENTS

| 5,996,984 | A | 12/1999 | Takahashi | |
|---|---|---|---|---|
| 6,199,847 | B1 * | 3/2001 | Fukui | 269/32 |
| 6,364,301 | B1 * | 4/2002 | Takahashi | 269/32 |

(Continued)

FOREIGN PATENT DOCUMENTS

| DE | 91 04 532 | 6/1991 |
|---|---|---|
| DE | 295 04 267 | 6/1995 |

(Continued)

OTHER PUBLICATIONS

International Search Report Issued Apr. 20, 2010 in PCT/JP10/54418 Filed Mar. 16, 2010.

*Primary Examiner* — Lee D Wilson
*Assistant Examiner* — Alvin Grant
(74) *Attorney, Agent, or Firm* — Oblon, Spivak, McClelland, Maier & Neustadt, L.L.P.

(57) ABSTRACT

Clamp devices configured such that dust does not enter insides of casings. The clamp devices each include the casing, and a clamp-side end section of a clamp arm is exposed from an opening of the casing. The clamp arm includes: a first circular arc section which is exposed from the casing when a workpiece is clamped by the clamp arm and is contained within the casing when the workpiece is not clamped by the clamp arm; and a second circular arc section which is exposed from the casing when the workpiece is not clamped by the clamp arm and is contained within the casing when the workpiece is clamped by the clamp arm. A first scraper and a second scraper are in sliding contact with the first circular arc section and the second circular arc section, respectively. The clamp device can also include a side surface cleaning scraper for making sliding contact with a side surface of the first circular section.

11 Claims, 8 Drawing Sheets

(56) References Cited

U.S. PATENT DOCUMENTS

| | | | |
|---|---|---|---|
| 6,378,856 B1 * | 4/2002 | Takahashi | 269/32 |
| 6,557,841 B2 * | 5/2003 | Dellach et al. | 269/32 |
| 6,685,177 B2 * | 2/2004 | Dugas et al. | 269/32 |
| 6,880,816 B1 * | 4/2005 | Wheeler et al. | 269/32 |
| 7,175,169 B2 * | 2/2007 | Yonezawa | 269/32 |

FOREIGN PATENT DOCUMENTS

| | | |
|---|---|---|
| JP | 1 117829 | 8/1989 |
| JP | 8 108328 | 4/1996 |
| JP | 10 306807 | 11/1998 |

* cited by examiner

CLAMP DEVICE

TECHNICAL FIELD

The present invention relates to a clamp apparatus (clamp device), and more specifically, to a clamp apparatus equipped with a swingable clamp arm for clamping a workpiece.

BACKGROUND ART

For example, in a process for manufacturing an automobile, various constituent elements are welded with respect to the automotive vehicle body. When such welding is performed, clamping of the constituent elements using a clamp apparatus is widely practiced for positioning and fixing the constituent elements in place.

As one type of clamp apparatus, the device disclosed in the specification of German Utility Model Registration No. 29504267 may be cited as an example. More specifically, such a clamp apparatus includes a casing, a cylinder disposed inwardly of the casing, and a clamp arm, which is connected to a rod of the cylinder through a toggle link mechanism. Linear translatory movement of the rod is converted into rotational movement by the toggle link mechanism, and as a result, the clamp arm undergoes swinging movement.

In the clamp apparatus of German Utility Model Registration No. 29504267, as shown in FIGS. 1 and 2 of this publication, a main body of the toggle link mechanism is accommodated in the casing, such that only a connecting shaft is exposed from a side wall of the casing, with a structure being provided in which one end of the clamp arm is connected to a distal end of the exposed connecting shaft. In this case, adhering of so-called spatter (debris), which is generated during welding, onto the main body of the toggle link mechanism can be avoided.

However, in the aforementioned structure in which the connecting shaft of the toggle link mechanism projects from a side surface of the casing, it is difficult for the casing, and hence the widthwise dimension of the clamp apparatus, to be made narrower in width, due to the fact that it is necessary for the connecting shaft to extend along a width direction of the casing.

For this reason, for example, the clamp apparatus cannot be inserted into a narrow clearance. Stated otherwise, a problem occurs in that the locations in which the clamp apparatus can be installed are limited.

For narrowing the widthwise dimension of the casing, as disclosed in German Utility Model Registration No. 9104532, a casing is constituted from a first casing member and a second casing member, in which it is thought to be effective for the clamp arm to project from an opening, which is formed by mating surfaces of the first casing member and the second casing member. In this case, as can be understood from FIG. 1 of this publication, it is not required for a connecting shaft of the toggle link mechanism to extend along the width direction of the casing.

SUMMARY OF INVENTION

With the clamp apparatus disclosed in German Utility Model Registration No. 9104532, it is necessary for the opening to be disposed partially in the range within which the clamp arm swings. For this reason, because the opening extends over a long distance, it is easy for debris to enter and penetrate into the interior of the casing from the opening. Stated otherwise, it becomes difficult for the toggle link mechanism to be protected from such debris.

In the invention of German Utility Model Registration No. 9104532, it is attempted to avoid penetration of debris into the casing interior by covering the clamp arm with a cover member. However, it is difficult to provide blockage over the entirety of the opening by means of such a cover member.

A general object of the present invention is to provide a clamp apparatus in which the widthwise dimension of the clamp apparatus can be made narrower.

A principal object of the present invention is to provide a clamp apparatus in which penetration of debris into the interior of the casing can be prevented.

According to an embodiment of the present invention, a clamp apparatus is provided including a clamp arm, one end portion of which is exposed from an opening of a casing, and another end portion of which is accommodated inside the casing, a support shaft that pivotally supports the other end portion of the clamp arm at the interior of the casing, and a cylinder having a rod that is connected to the clamp arm through a toggle link mechanism arranged in the interior of the casing, and which causes the clamp arm to swing about the support shaft by converting linear movement of the rod into rotational movement through the toggle link mechanism. Further, an arcuate portion is formed on the clamp arm and is curved about the support shaft, and the arcuate portion is exposed to the exterior of the casing when the clamp arm swings so as to clamp a workpiece, whereas the arcuate portion is accommodated inside the casing when the clamp arm swings so as to release the workpiece. Also, a scraper, which is in sliding contact against an arcuate surface of the arcuate portion when the clamp arm swings, is provided on the casing.

There is a concern that foreign matter could become adhered with respect to an exposed location (arcuate portion) of the clamp arm, which is exposed from the casing when the clamp arm clamps a workpiece. Further, in the event that welding is carried out with respect to the workpiece, spatter (debris) may also become adhered to such a location. When the arcuate portion, in a state of having such matter adhered thereto, is accommodated inside the casing upon the clamp arm releasing the workpiece, such foreign matter and debris enter and penetrate into the casing.

However, according to the present invention, when the clamp arm is swung, the scraper is placed in sliding contact with the arcuate surface of the arcuate portion. Accordingly, since foreign matter and debris are scraped off from the arcuate surface, the arcuate surface is cleaned. Further, since the arcuate portion is accommodated inside the casing in this state, foreign matter and debris can be effectively prevented from penetrating into the casing interior.

As a result, the adverse influence of foreign matter and debris on operations of the toggle link mechanism can be avoided. Owing thereto, appropriate swinging movement of the clamp arm can be maintained over a long time. Stated otherwise, the frequency at which maintenance is carried out is significantly reduced.

More specifically, according to the present invention, when the clamp arm swings, the scraper is brought into sliding contact with respect to the arcuate portion as the arcuate portion becomes accommodated inside the casing, and therefore, penetration of foreign matter or debris into the casing interior can effectively be prevented. Consequently, because the adverse influence of foreign matter and debris on operations of the toggle link mechanism can be avoided, appropriate swinging movement of the clamp arm can be maintained over a long time.

Further, because the clamp arm is exposed from the opening of the casing, there is no need for a connecting shaft of the toggle link mechanism to project outwardly from a side surface of the casing. Owing thereto, the casing, and hence the widthwise dimension of the clamp apparatus, can be made narrower in width.

The scraper can be disposed while being exposed on the exterior of the casing.

Further, preferably, the scraper functions as a seal for blocking a clearance between the casing and the arcuate portion. As a result, penetration of foreign matter or debris into the casing interior through the clearance can be prevented.

Further, another arcuate portion may be formed on the clamp arm and may be curved about the support shaft, and the other arcuate portion is accommodated inside the casing when the clamp arm swings so as to clamp a workpiece, whereas the other arcuate portion is exposed to the exterior of the casing when the clamp arm swings so as to release the workpiece. In this case, another scraper, which is in sliding contact against an arcuate surface of the other arcuate portion when the clamp arm swings, may be provided on the casing.

The other scraper, for example, can be disposed while being accommodated inside the casing.

In addition, the other scraper preferably functions as a seal for blocking a clearance between the casing and the other arcuate portion.

In the foregoing manner, the opening for enabling swinging movement of the clamp arm can be blocked substantially over the entirety thereof. Therefore, penetration of foreign matter or debris into the casing interior can be more effectively avoided.

In the above configuration, side surface cleaning scrapers may be provided on the casing, which are in sliding contact against side surfaces of the arcuate portion when the clamp arm swings. In this case, when the clamp arm is swingably operated in the foregoing manner, since the side surface cleaning scrapers are in sliding contact with respect to side surfaces of the arcuate portion, side surfaces of the arcuate portion also are cleaned. Owing thereto, penetration of foreign matter or debris into the casing interior can be prevented more effectively, and the adverse influence on operations of the toggle link mechanism can be further avoided, so that the clamp arm can undergo suitable swinging movement over a longer time.

Furthermore, a clamp unit may be constructed by connecting together a plurality of clamp apparatus. In this case, the clamp apparatus are connected in parallel such that respective clamp arms thereof are swingable in the same direction.

DESCRIPTION OF EMBODIMENTS

Below, preferred embodiments of a clamp apparatus according to the present invention will be presented and described in detail with reference to the accompanying drawings.

Figure 1:
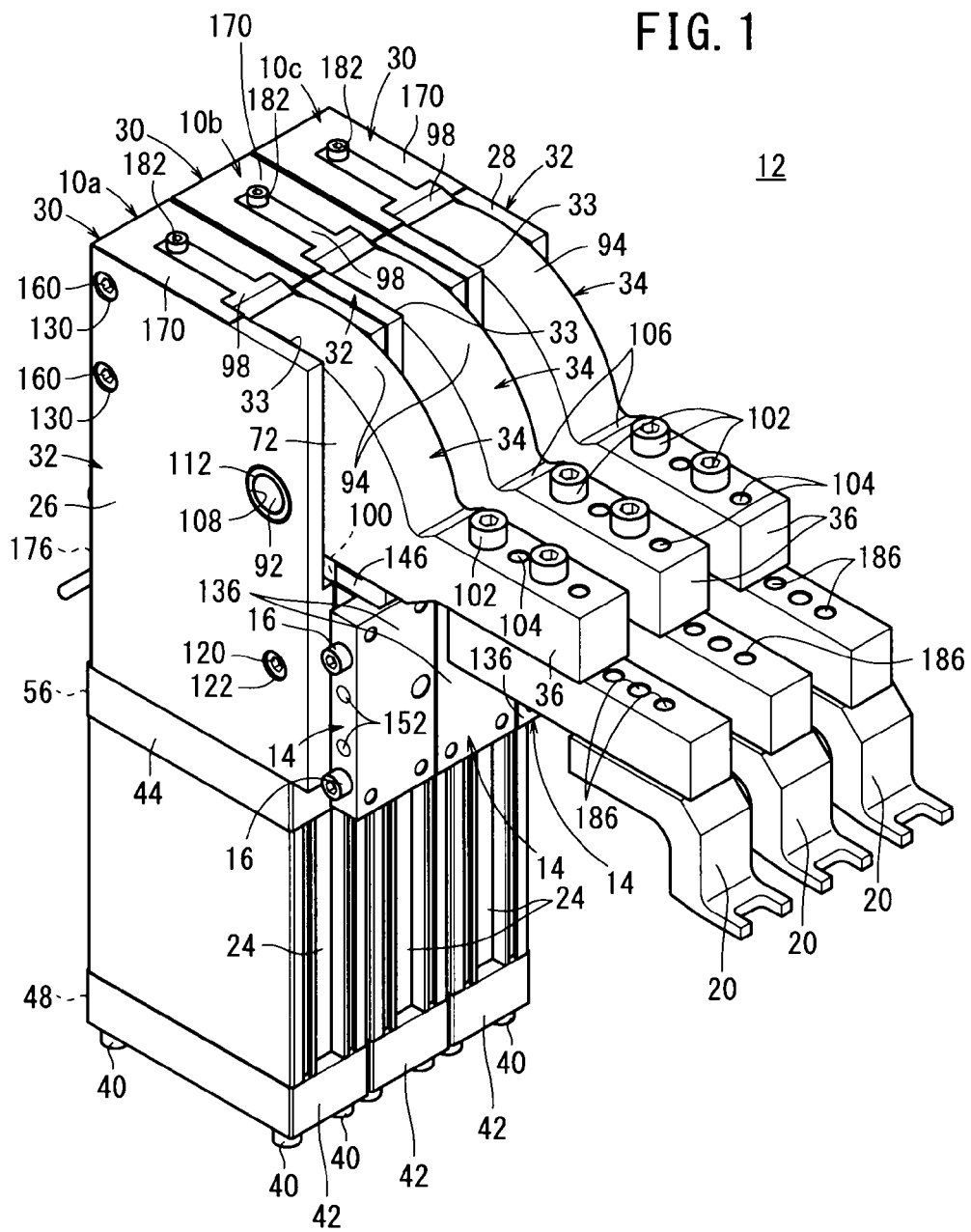
FIG. 1 is an overall outline perspective view of a clamp unit including a clamp apparatus according to an embodiment of the present invention.
Figure 2:
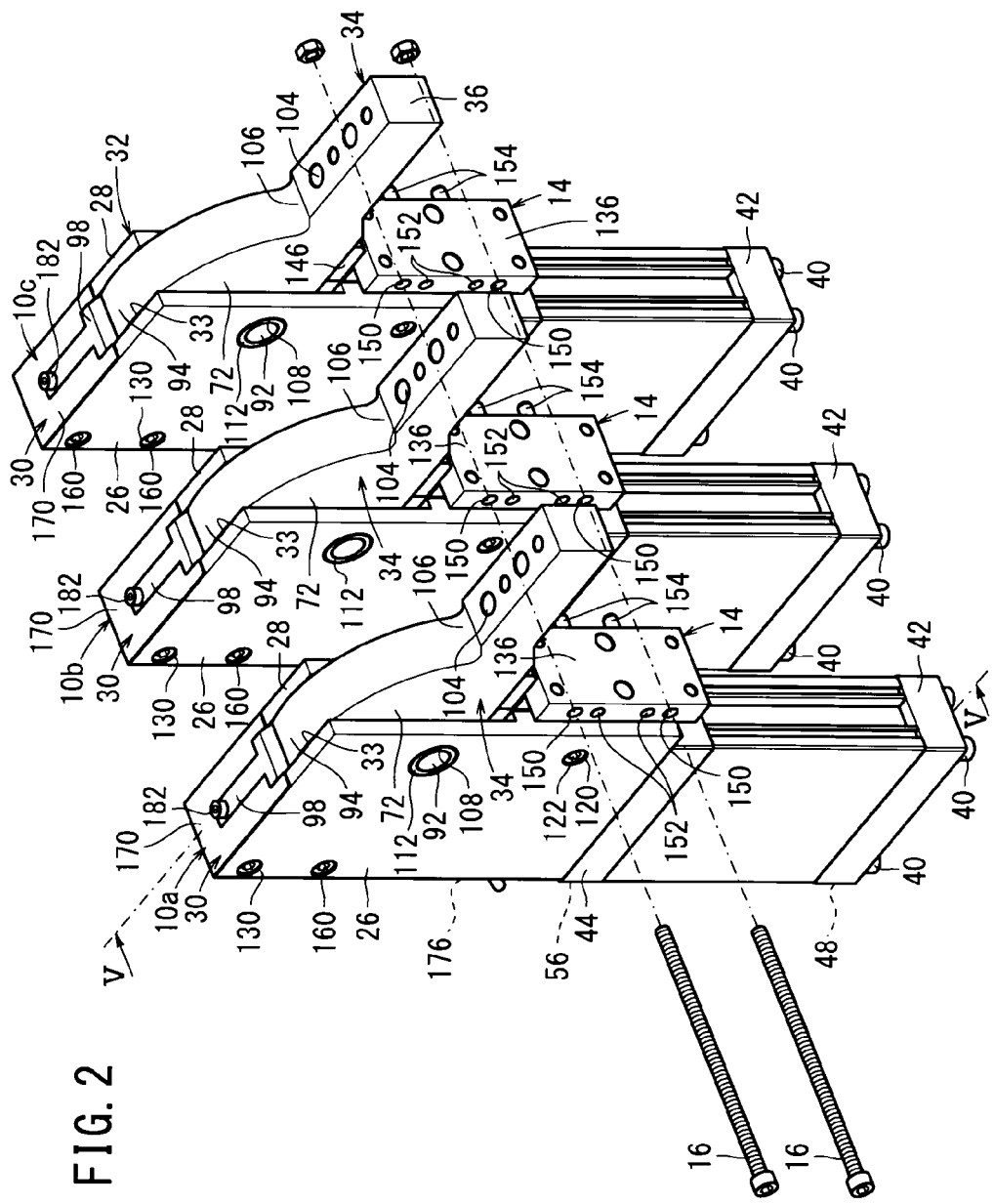
FIG. 2 is an exploded perspective view of the clamp unit.
Figure 3:
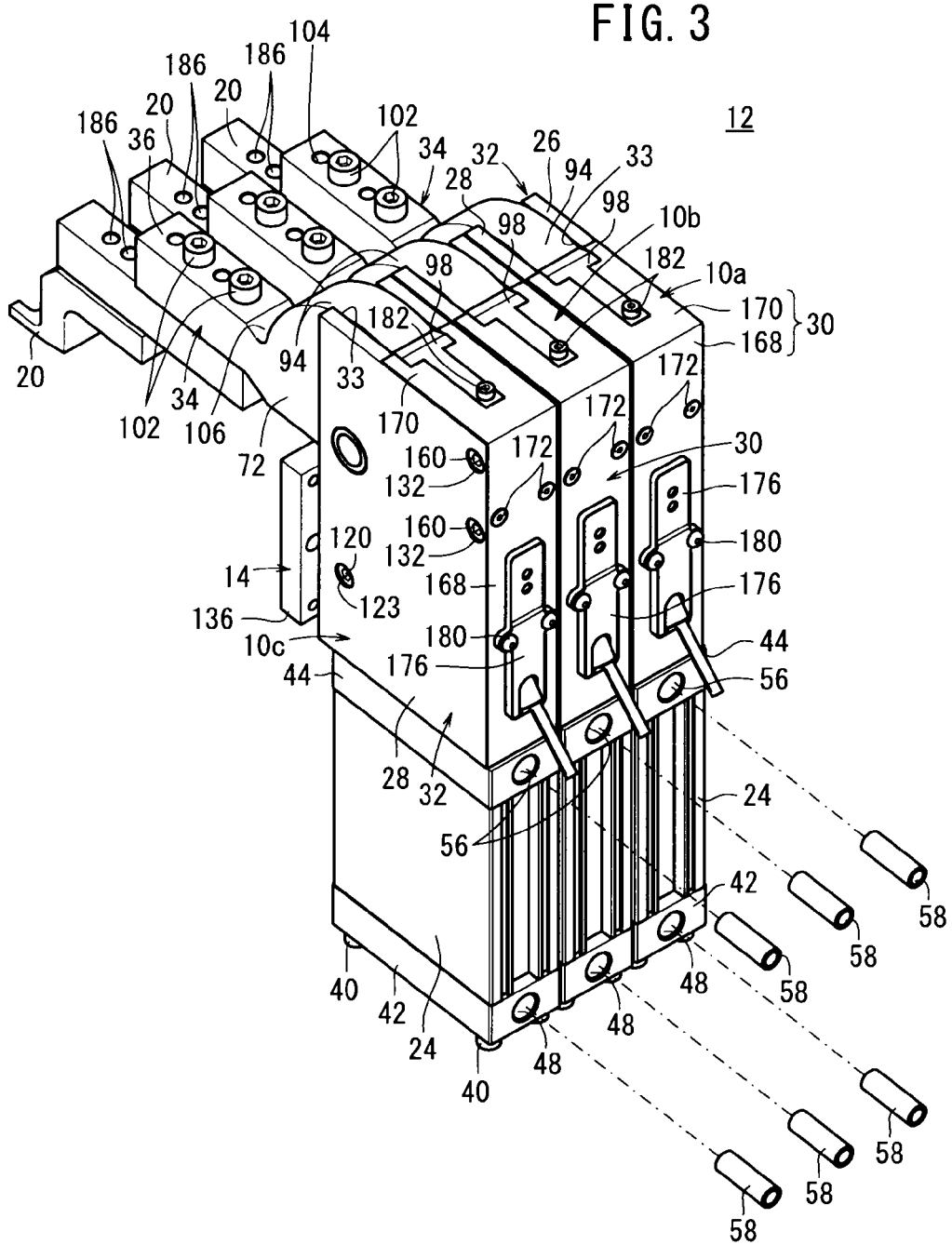
FIG. 3 is an overall outline perspective view of the clamp unit as seen from a different angle.

FIGS. 1 through 3, respectively, show an overall outline perspective view, an exploded perspective view, and an overall outline perspective view as seen from a different angle, of a clamp unit 12 including clamp apparatus 10a to 10c according to an embodiment of the present invention. The clamp unit 12 is constituted by respective clamp apparatus 10a to 10c having the same structure mutually, and which are connected together through tie rods 16 and connecting brackets 14, 14, 14 (see FIGS. 2 and 3), which are disposed on principal surfaces of the clamp apparatus 10a to 10c. In FIG. 2, claw members 20 (see FIGS. 1 and 3) are not shown.

The structure of the clamp apparatus 10a will now be described in detail.

Figure 4:
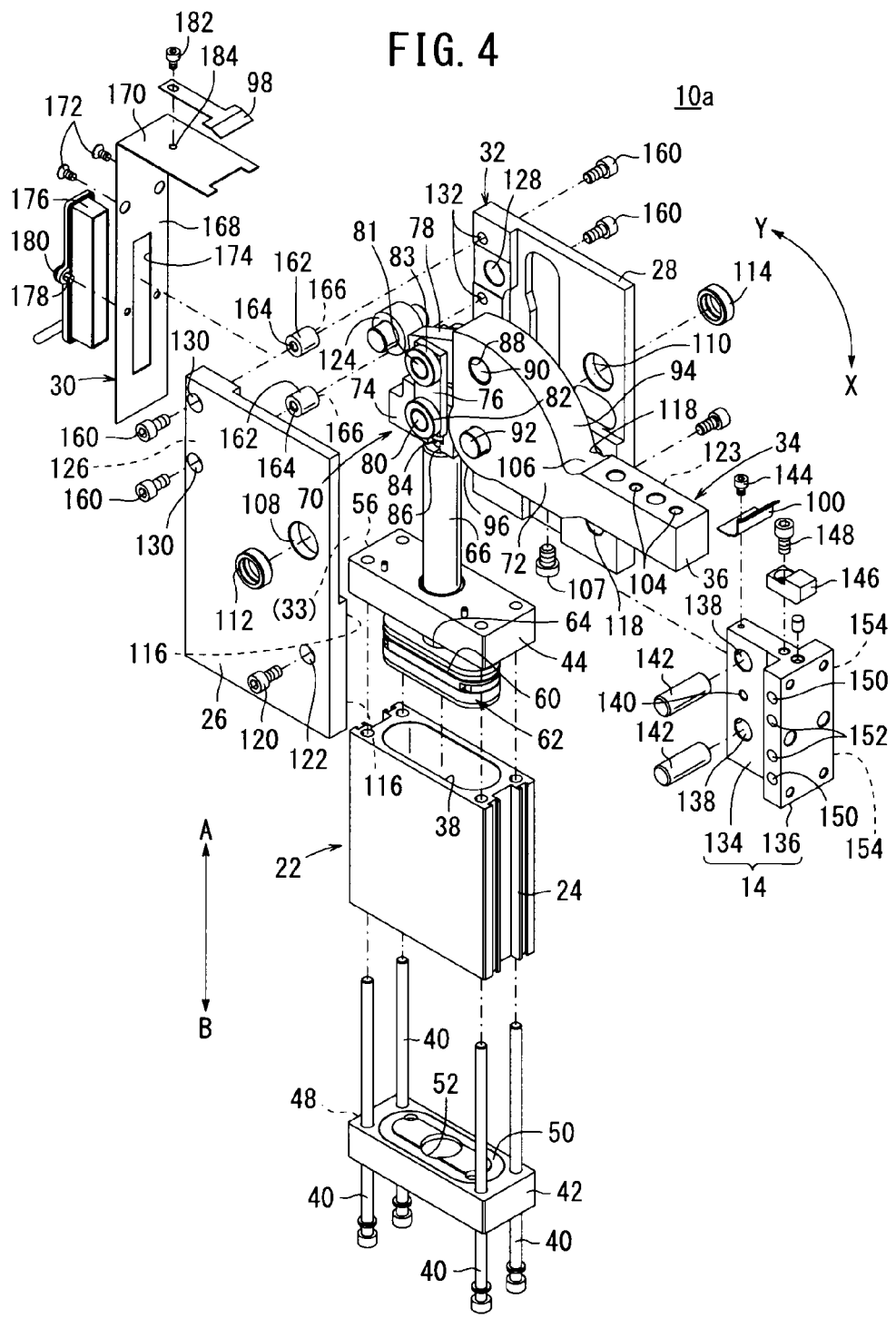
FIG. 4 is an exploded perspective view of the clamp apparatus.
Figure 5:
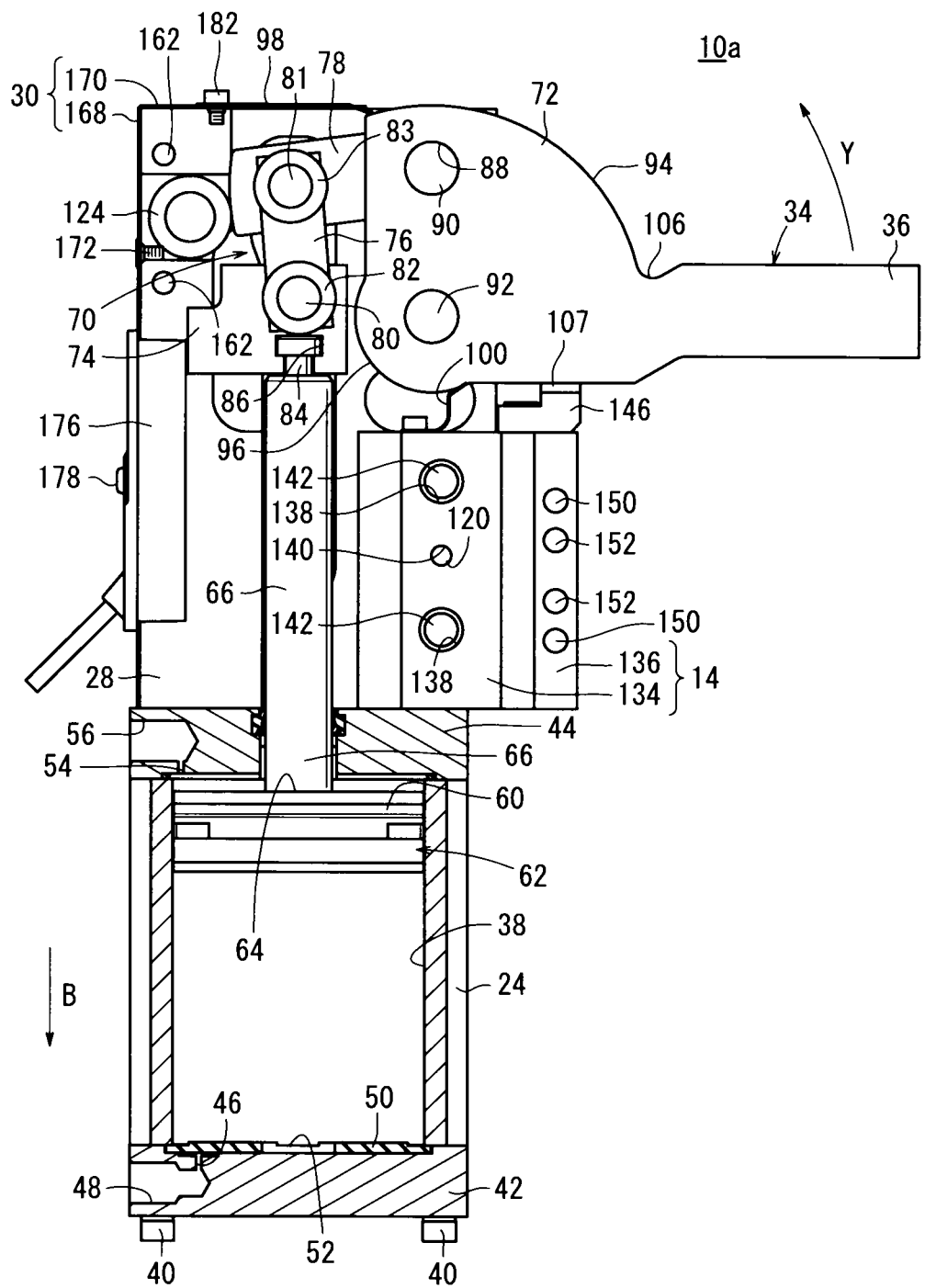
FIG. 5 is a cross sectional view as observed in the direction of arrows V-V of FIG. 2.

FIGS. 4 and 5, respectively, are an exploded perspective view, and a cross sectional view as observed in the direction of arrows V-V in FIG. 2, of the clamp apparatus 10a. The clamp apparatus 10a includes a cylinder tube 24 that constitutes a cylinder 22, and a casing 32 that is constructed by assembling together a first casing member 26, a second casing member 28, and a back surface cover 30. One end portion (clamp side end portion 36) of a clamp arm 34 is exposed from an opening 33, which is formed by mating surfaces of the first casing member 26 and the second casing member 28.

A cylinder chamber 38, which is elliptically shaped and having a large diameter, is formed along an axial direction in the cylinder tube 24. The cylinder chamber 38 is blocked by a head cover 42 and a rod cover 44, which are connected via elongate connecting rods 40 on respective lower and upper ends of the cylinder tube 24, as shown in FIGS. 4 and 5.

As shown in FIG. 5, at a region corresponding to the back surface of the head cover 42, a first port 48 is formed that communicates with the cylinder chamber 38 through a communication passage 46. Further, a damper 50 is attached to an end surface on the head cover 42 on a side facing toward the cylinder chamber 38, with a recess 52 being formed as a depression in a substantially central portion of the damper 50.

Similar to the head cover 42, at a region corresponding to the back surface of the rod cover 44, a second port 56 is formed that communicates with the cylinder chamber 38 through a communication passage 54. The first port 48 and the second port 56 make up intake and exhaust openings for introducing or discharging compressed air with respect to the cylinder chamber 38. Moreover, as shown in FIG. 3, intake and exhaust pipes 58 are connected respectively to the first port 48 and the second port 56 through non-illustrated pipe fittings.

An elliptically shaped piston 62 having a seal member 60 externally fitted thereon is accommodated in the cylinder chamber 38 (see FIGS. 4 and 5). Naturally, the seal member 60 is held in contact slidably with respect to the inner wall of the cylinder chamber 38, and therefore, compressed air that is introduced into the cylinder chamber 38 from the first port 48 does not flow past the piston 62 and is not discharged from the second port 56, and similarly, compressed air that is introduced into the cylinder chamber 38 from the second port 56 does not flow past the piston 62 and is not discharged from the first port 48.

A circular insertion hole 64 is formed in the piston 62, and a rod 66 is fitted into the circular insertion hole 64. By crimping or swaging the end portion on the rod 66 that is inserted into the piston 62, the piston 62 is prevented from being pulled off from the rod 66.

On the other hand, another end portion (connection side end portion 72) of the clamp arm 34 is connected through a toggle link mechanism 70 to the distal end of the rod 66.

More specifically, the toggle link mechanism 70 includes in this order a knuckle joint 74, a first link member 76, and a second link member 78, which extend from the side of the rod 66 to the clamp arm 34, and is constructed such that the knuckle joint 74 and the first link member 76 are connected together via a first rod pin 80, and the first link member 76 and the second link member 78 are connected together via a second rod pin 81. Guide rollers 82, 83 are externally fitted, respectively, onto the first rod pin 80 and the second rod pin 81.

A small diameter fitting portion 84, which is reduced in diameter, is formed to project integrally on the distal end of the rod 66. On the other hand, a fitting groove 86 is formed in the knuckle joint 74, such that the rod 66 and the knuckle joint 74 are connected together by fitting the small diameter fitting portion 84 into the fitting groove 86.

Further, the clamp arm 34 includes a wide connection side end portion 72 that is connected to the toggle link mechanism 70, and an elongate substantially rectangular parallelepiped shaped clamp side end portion 36, which projects outwardly and extends from the casing 32. The connection side end portion 72 is formed as a hollow body, and link pin engagement holes 88 are formed respectively therein to penetrate through end surfaces on sides facing toward respective end surfaces of the first casing member 26 and the second casing member 28.

An end of the second link member 78 is inserted into the hollow connection side end portion 72. Link pins 90 are formed, respectively, to project on respective side surfaces of the second link member 78, such that the two link pins 90 are made to engage respectively with the two link pin engagement holes 88.

As a result of the first link member 76 bridging the knuckle joint 74, which is connected to the rod 66 as described above, and the second link member 78, which is connected to the connection side end portion 72 of the clamp arm 34, as described later, linear translatory movement of the rod 66 is converted into rotational (swinging) movement of the clamp arm 34. Further, in a state in which the clamp arm 34 clamps a workpiece, a curved end surface of the second link member 78 abuts against a later-described fixed roller 124.

On the connection side end portion 72 of the clamp arm 34, a pivot pin 92 (support shaft), which is oriented toward respective end surfaces of the first casing member 26 and the second casing member 28, is formed so as to project outwardly at a location further downward from, i.e., below, the link pins 90. As discussed later, the clamp arm 34 swings about the pivot pin 92.

A first arcuate portion 94, which curves toward the clamp side end portion 36 from the second link member 78, is formed on the connection side end portion 72. The first arcuate portion 94 forms an arc about the pivot pin 92 and with an arclength which is roughly ¼ the circumferential length of a circle centered about the pivot pin 92.

In the vicinity of the pivot pin 92 on the connection side end portion 72, a second arcuate portion 96 is formed so as to bend centrally about the same pivot pin 92. The arclength of the second arcuate portion 96 is roughly ¼ the circumferential length of a circle centered about the pivot pin 92.

Figure 6:
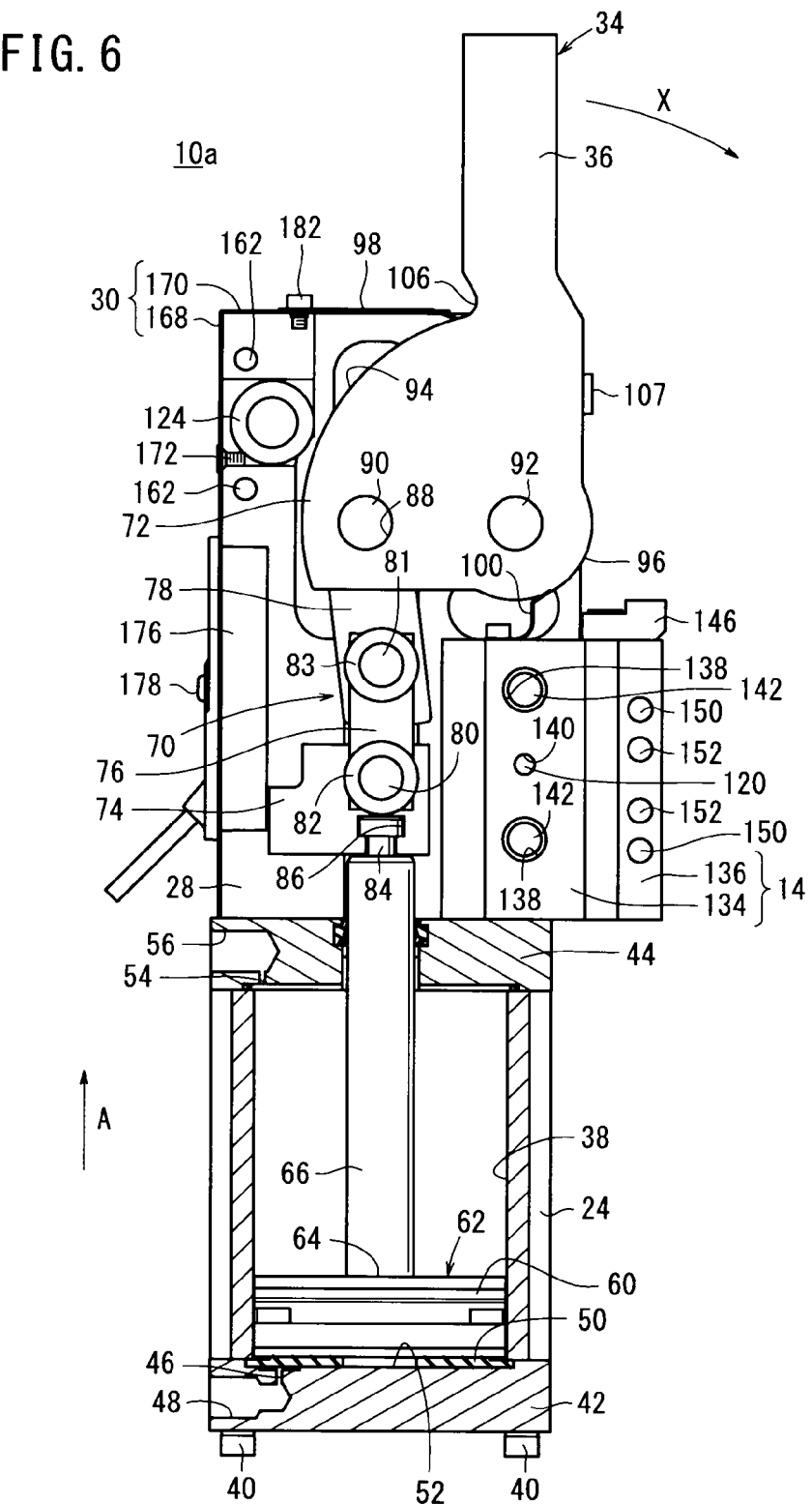
FIG. 6 is an outline vertical cross sectional view showing a state in which the clamp arm constituting the clamp apparatus is swung from the state shown in FIG. 5.

In FIGS. 1 through 5, a state is shown in which the clamp side end portion 36 of the clamp arm 34 is in a recumbent posture for clamping a non-illustrated workpiece, and at this time, the first arcuate portion 94 is exposed from the casing 32, whereas the second arcuate portion 96 is accommodated inside the casing 32 (see FIGS. 1 to 3 and 5). On the other hand, as shown in FIG. 6, in the case that the clamp side end portion 36 is placed upright to release the workpiece, the first arcuate portion 94 is accommodated inside the casing 32, whereas the second arcuate portion 96 is exposed from the casing 32. As will be discussed later, during both processes, when the clamp arm 34 is swung and the clamp side end portion 36 is moved from the recumbent posture into an upstanding condition, or is moved from the upstanding condition into a recumbent posture, a first scraper 98 is in sliding contact against the arcuate surface of the first arcuate portion 94, and a second scraper 100 is in sliding contact against the arcuate surface of the second arcuate portion 96.

In the clamp side end portion 36, which is joined to the connection side end portion 72 that is constructed in the foregoing manner, a plurality of claw connecting screw insertion holes 104 are formed to penetrate therethrough (see FIG. 4), for insertion of claw connecting screws 102, which serve to connect claw member 20 (see FIG. 1) to the clamp side end portion 36. Stated otherwise, the claw member 20 is connected securely to the clamp arm 34 through the claw connecting screws 102.

A recessed part 106 is formed as a depression at the border between the first arcuate portion 94 and the clamp side end portion 36. An end of the first scraper 98 is inserted into the recessed part 106 when the clamp side end portion 36 is placed in an upstanding posture (see FIG. 6).

Further, a regulating screw 107 is provided on the clamp arm 34, on a surface opposite from the recessed part 106, at a position corresponding roughly to the position of the recessed part 106.

Support shaft holes 108, 110 are formed to penetrate respectively through the first casing member 26 and the second casing member 28 (see FIG. 4). The pivot pin 92 is inserted rotatably via bushes 112, 114 into each of the support shaft holes 108, 110.

In the first casing member 26 and the second casing member 28, at principal side surfaces of end faces on the inner wall side of the casing 32, and at positions proximate to the clamp side end portion 36 in a recumbent posture, two bracket positioning holes 116, 118 are formed as recesses parallel with the vertical direction in FIG. 4. Furthermore, between the bracket positioning holes 116, 118, support screw through holes 122, 123 are formed through which support screws 120 are passed for connection to and supporting of the connecting bracket 14.

As can be understood from FIG. 4, the connecting bracket 14 is substantially T-shaped as viewed in plan, on which there are integrally provided a narrow elongate end portion 134, which extends along the axial direction of the casing 32, and a wide short end portion 136, which extends in a direction perpendicular to the direction of extension of the elongate end portion 134. Additionally, two bracket positioning holes 138 are formed to penetrate through the narrow elongate end portion 134. Between the bracket positioning holes 138, a support screw hole 140 is formed for screw-engagement therein of the support screws 120.

Positioning pins 142 are inserted respectively through the bracket positioning holes 138, and respective end surfaces of the positioning pins 142 are seated on bottom surfaces of the bracket positioning holes 116, 118, which are formed as recesses in the first casing member 26 and the second casing member 28. Owing thereto, the positioning pins 142, and thus the connecting bracket 14, are positioned with respect to the casing 32.

In such a condition, the support screws 120 are inserted through each of the support screw through holes 122, 123 of the first casing member 26 and the second casing member 28, and further, together with screw-engagement thereof in the support screw hole 140 formed in the elongate end portion 134 of the connecting bracket 14, the connecting bracket 14 is connected securely to the casing 32. Moreover, the entirety of the exposed regions of the positioning pins 142, which are exposed from the bracket positioning holes 138, are inserted into the bracket positioning holes 116, 118. Accordingly, no clearances are formed between the elongate end portion 134 of the connecting bracket 14 and the first casing member 26 and the second casing member 28.

The second scraper 100 is fixed in position on the elongate end portion 134 by a first set screw 144. Further, a stopper member 146 for restricting swinging movement of the clamp arm 34 (clamp side end portion 36) by abutment and stoppage of the regulating screw 107 thereagainst is connected to the short end portion 136 through a second set screw 148. Two tie rod insertion holes 150 are formed to penetrate through in the axial direction of the short end portion 136.

Two projection pin engagement holes 152 are formed as recesses, which are sandwiched between the two tie rod insertion holes 150 on one side surface of the short end portion 136. Further, on the other side surface thereof, projection pins 154 are formed, which engage with the projection pin engagement holes 152 of the connecting bracket 14 of another clamp apparatus 10b adjacent to the clamp apparatus 10a (see FIG. 2).

Further, roller shaft holes 126, 128, into which a roller shaft of the fixed roller 124 is inserted, are formed in the first casing member 26 and the second casing member 28 at positions proximate to the toggle link mechanism 70 on rear surface sides in the end surfaces on the inner wall sides of the casing 32. In addition, two spacer connection screw insertion holes 130, 132 are provided, which sandwich the roller shaft holes 126, 128 therebetween.

As shown in FIG. 4, spacer connection screws 160 are inserted respectively into the spacer connection screw insertion holes 130, 132. Each of the spacer connection screws 160 are screw-engaged with spacer connection screw holes 164, 166, which are bored into bottom surfaces of substantially cylindrical shaped spacers 162. The height dimension from one bottom surface to the other bottom surface of each of the spacers 162 corresponds to the widthwise dimension of the elongate end portion 134 of the connection bracket 14. Therefore, the first casing member 26 and the second casing member 28 extend mutually in parallel from principal surface side end portions thereof proximate to the clamp side end portion 36 of the clamp arm 34, to the back surface side end portions thereof proximate to the fixed roller 124.

At the back surface side end portions proximate to the fixed roller 124, a clearance is formed between the first casing member 26 and the second casing member 28. The back surface cover 30, which constitutes part of the casing 32, blocks this clearance. The back surface cover 30 is made up from a downwardly hanging portion 168 that extends along the vertical direction in FIGS. 1 through 5, and a scraper fixing part 170, which is bent and extends substantially perpendicularly with respect to the downwardly hanging portion 168. The downwardly hanging portion 168 is connected securely to the first casing member 26 and the second casing member 28 through cover connecting screws 172. More specifically, non-illustrated cover connecting screw holes are formed in the first casing member 26 and the second casing member 28, and the cover connecting screws 172 are screw-engaged with the cover connecting screw holes.

A proximity switch 176 that detects when the knuckle joint 74 is positioned at a bottom dead center or a top dead center position is fitted into an opening 174 formed in the downwardly hanging portion 168 of the back surface cover 30. The proximity switch 176 is connected securely to the first casing member 26 and the second casing member 28 through switch connecting screws 178. Switch connecting screw insertion holes 180 are formed to penetrate through the downwardly hanging portion 168, such that after the switch connecting screws 178 have passed through each of the switch connecting screw insertion holes 180, the switch connecting screws 178 are screw-engaged with non-illustrated switch connecting screw holes that are formed in the first casing member 26 and the second casing member 28.

The first scraper 98, which is substantially T-shaped, is positioned and fixed securely in place through a scraper connecting screw 182 to the scraper fixing part 170 of the back surface cover 30. Of course, a scraper connecting screw hole 184 is provided in the scraper fixing part 170, and the scraper connecting screw 182 is screw-engaged with the scraper connecting screw hole 184.

In the aforementioned structure, the first scraper 98 and the second scraper 100 are formed from thin metallic plates, which exhibit elasticity and further exhibit a suitable elastic force. The material of the first scraper 98 and the second scraper 100 may also be rubber.

The first scraper 98 blocks a clearance formed between the arcuate surface of the first arcuate portion 94 of the clamp arm 34 and the casing 32, whereas the second scraper 100 blocks a clearance between the arcuate surface of the second arcuate portion 96 and the casing 32. As can be understood from this fact, the first scraper 98 and the second scraper 100 function as seals.

Claw connecting screw holes 186 are provided in plurality on the claw member 20 for screw-engagement therein of the claw connecting screws 102. When the claw member 20 is attached with respect to the clamp arm 34, the claw connecting screw insertion holes 104 through which the claw connecting screws 102 are inserted, and the claw connecting screw holes 186 with which the claw connecting screws 102 are screw-engaged are selected corresponding to a required projecting length (reach length) of the claw member 20.

The remaining clamp apparatus 10b, 10c are of the same structure as the clamp apparatus 10a. Therefore, the same constituent elements thereof are designated by the same reference numerals, and detailed descriptions of such features are omitted.

The clamp apparatus 10a, 10b are provisionally connected and positioned by engagement of the projection pins 154 of the connecting bracket 14 of the clamp apparatus 10a with the projection pin engagement holes 152 of the connecting bracket 14 of the clamp apparatus 10b. The clamp apparatus 10b, 10c are provisionally connected and positioned in a similar manner. In addition, by tightening the tie rods 16, which are inserted through the tie rod insertion holes 150 of the three connecting brackets 14, 14, 14, the clamp apparatus 10a through 10c are mutually and firmly connected to each other.

Additionally, a non-illustrated directional control valve and a non-illustrated pressure control valve are connected to the intake and exhaust pipes 58 (see FIG. 3), to thereby constitute the clamp unit 12 shown in FIGS. 1 and 3.

The clamp unit 12, including the clamp apparatus 10a to 10c according to the present embodiment, is constructed basically as described above. Next, operations and advantages of the clamp unit 12 and the clamp apparatus 10a to 10c will be described.

In each of the clamp apparatus 10a to 10c, the clamp side end portion 36 of the clamp arm 34 projects from the opening of the casing 32. Accordingly, there is no need for a connecting shaft of the toggle link mechanism to extend and be exposed to the exterior of the casing 32, as disclosed in the specification of the aforementioned German Utility Model Registration No. 29504267. Therefore, the widthwise dimension of the clamp apparatus 10a to 10c can be made narrow, thereby enlarging the degree of freedom of locations in which the clamp unit 12 can be installed.

The clamp unit 12 is attached to a non-illustrated fixing means or the like, and in this state, is installed, for example, in a welding station of an automobile production line. At this time, as shown in FIG. 6, the clamp side end portion 36 of each of the clamp arms 34 is in an upstanding condition, whereby a constituent element that makes up the workpiece is not clamped thereby. Stated otherwise, the clamp arm 34 is in an unclamped state. At this point in time, the piston 62 is in a bottom dead center position, and the rod 66 is retracted to a rearward end.

Further, the bottom dead center positioned piston 62 is seated on the damper 50. Moreover, the first arcuate portion 94 of the clamp arm 34 is accommodated inside the casing 32, whereas the second arcuate portion 96 is exposed from the casing 32.

Upon clamping a workpiece, compressed air is supplied from a non-illustrated compressed air supply source. The compressed air, after passing through the aforementioned directional control valve, the pressure control valve, and the intake and exhaust pipes 58 (see FIG. 3), is introduced into the first port 48 (see FIG. 6) of the head cover 42, and then passes through the communication passage 46 and arrives at the cylinder chamber 38. Of course, compressed air that is already accommodated inside the cylinder chamber 38 passes through the communication passage 54 and the second port 56 of the rod cover 44, and the intake and exhaust pipes 58, and then is directed out to an intake and exhaust manifold.

As a result, an upwardly directed pressure acts on the bottom dead center positioned piston 62, and consequently, the piston 62 begins to be displaced upwardly (in the direction of arrow A) in FIG. 6, and following thereon, the rod 66 also begins to advance in an upward direction (in the direction of arrow A).

Accompanying advancement of the piston 62, the knuckle joint 74 and the first link member 76 rise. As a result, the end of the second link member 78 is pressed upward, and the clamp arm 34 that is connected to the second link member 78 by the link pin 90 is swung and oriented in the direction of the arrow X about the pivot pin 92.

Accompanying such swinging movement, the first arcuate portion 94 gradually becomes exposed from the casing 32, whereas the second arcuate portion 96 gradually is accommodated inside the casing 32. During this process, the second scraper 100 is in sliding contact with the arcuate surface of the second arcuate portion 96. Accordingly, even if foreign matter or debris floating within the assembly station comes into contact with and adheres to the arcuate surface of the second arcuate portion 96, such foreign matter is scraped off under the action of the second scraper 100.

At the same time, the first scraper 98 is in sliding contact with the arcuate surface of the first arcuate portion 94, and thus, the cleaned first arcuate portion 94 is exposed from the casing 32. Accordingly, adherence of foreign matter to the arcuate surface of the first arcuate portion 94, and mixing of such foreign matter in welding locations can be prevented.

The first scraper 98 is in sliding contact over the entire arcuate surface of the first arcuate portion 94, and similarly, the second scraper 100 is in sliding contact over the entire arcuate surface of the second arcuate portion 96. That is because, as described above, the first arcuate portion 94 and the second arcuate portion 96 are formed to curve about the pivot pin 92, and the center of swinging motion of the first arcuate portion 94 and the second arcuate portion 96 is defined by the pivot pin 92.

Lastly, as shown in FIG. 5, the regulating screw 107 abuts against and is stopped by the stopper member 146, and swinging movement of the clamp side end portion 36 of the clamp arm 34 is restricted, together with the knuckle joint 74 and the piston 62 reaching the top dead center position, whereby the advancing operation of the rod 66 to the forward end is completed. At this time, as shown in FIGS. 1 through 5, the clamp side end portion 36 of the clamp arm 34 is placed in a recumbent posture, and the claw member 20 (see FIG. 1) clamps the workpiece. Further, the entirety of the first arcuate portion 94 is exposed from the casing 32, whereas the entirety of the second arcuate portion 96 is accommodated inside the casing 32.

While the workpiece is being clamped, a reactive force is generated responsive to the clamping force. Such a reactive force is transmitted to the second link member 78 through the clamp arm 34, and furthermore, is transmitted to the fixed roller 124 that is in contact with the curved end face of the second link member 78. More specifically, the reactive force is received and absorbed by the fixed roller 124.

In this condition, arrival of the knuckle joint 74 at the top dead center position is detected by the upper part of the proximity switch 176. The proximity switch 176 transmits a detection signal to a non-illustrated control circuit. The control circuit, having received the detection signal, judges that "workpiece clamping is completed," and issues a command with respect to a non-illustrated welding robot to carry out a welding operation.

Thereafter, welding is carried out on the workpiece and the automotive vehicle body. At this time, so-called spatter is scattered as debris from the welding location. However, because the first scraper 98 and the second scraper 100 function as seals, which block clearances between the casing 32 and the clamp arm 34, such debris does not enter and penetrate into the interior of the casing 32. Accordingly, the toggle link mechanism 70 is prevented from becoming contaminated.

In the foregoing manner, penetration of foreign matter or debris into the interior of the casing 32 is prevented. Consequently, the adverse influence of foreign matter and debris on operations of the toggle link mechanism 70 can effectively be avoided.

Moreover, from time to time, debris may come into contact with and adhere to the first arcuate portion 94.

After completion of welding, compressed air is supplied from the non-illustrated compressed air supply source, so that a state is brought about in which the clamp side end portion 36 of the clamp arm 34 is placed in an upstanding posture and the clamp arm 34 is in unclamped state again. In this case, compressed air passes through the intake and exhaust manifold, the intake and exhaust pipes 58 (see FIG. 3), the second port 56 of the rod cover 44 (see FIG. 5), and the communication passage 54, and is introduced into the cylinder chamber 38. Simultaneously therewith, compressed air that is already accommodated inside the cylinder chamber 38 passes through the communication passage 46 of the head cover 42, the first port 48, and the intake and exhaust pipes 58, and then is directed out to the intake and exhaust manifold.

As a result, a downwardly directed pressure acts on the top dead center positioned piston 62, and consequently, the piston 62 begins to be displaced downwardly in FIG. 5 (in the direction of arrow B), and following thereon, the rod 66 also begins to retract in an downward direction (in the direction of arrow B).

Accompanying retraction of the piston 62, the knuckle joint 74 and the first link member 76 are lowered. Following thereon, the end of the second link member 78 is pulled downward, and the clamp arm 34 that is connected to the second link member 78 by the link pin 90 is swung and oriented in the direction of the arrow Y about the pivot pin 92.

Accompanying such swinging movement, the first arcuate portion 94 gradually becomes accommodated inside the casing 32, whereas the second arcuate portion 96 gradually is exposed from the casing 32. During this process, the first scraper 98 is in sliding contact with the arcuate surface of the first arcuate portion 94. Accordingly, even if debris comes into contact with and adheres to the arcuate surface of the first arcuate portion 94, such debris is scraped off under the action of the first scraper 98. Foreign matter that may be adhered to the arcuate surface of the first arcuate portion 94 is handled in a similar manner. Owing thereto, the arcuate surface of the first arcuate portion 94 can always be maintained in a clean condition.

Consequently, entry and penetration of debris or foreign matter that is adhered to the arcuate surface of the first arcuate portion 94 into the interior of the casing 32 can be prevented. From this standpoint as well, the toggle link mechanism 70 can be protected from debris or foreign matter, and as a result, suitable operations of the toggle link mechanism 70, and hence suitable swinging movement of the clamp arm 34, can be maintained over a long period.

At the same time, the second scraper 100 remains in sliding contact with respect to the arcuate surface of the second arcuate portion 96.

Ultimately, the piston 62 arrives at the bottom dead center position shown in FIG. 6. Along therewith, the retracting operation to the rear end of the rod 66 is brought to an end, and as shown in FIG. 6, the clamp side end portion 36 of the clamp arm 34 is placed in an upstanding condition, and the claw member 20 (see FIG. 1) is separated away from the workpiece. More specifically, an unclamped condition is brought about, whereby the workpiece is released.

At this time, the entirety of the first arcuate portion 94 is accommodated in the interior of the casing 32, whereas the entirety of the second arcuate portion 96 is exposed from the casing 32. Naturally, during the process of becoming exposed from the casing 32, the second arcuate portion 96 is subjected to cleaning by the second scraper 100.

In the foregoing manner, entry and penetration of debris into the interior of the casing 32 is prevented. More specifically, according to the present embodiment, clamp apparatus 10*a* to 10*c* can be constructed in which the widthwise dimension thereof can be made narrower, and penetration of debris into the interior of the casing 32 can easily be prevented.

In the above condition, arrival of the knuckle joint 74 at the bottom dead center position is detected by the lower part of the proximity switch 176. The proximity switch 176 transmits a detection signal to the non-illustrated control circuit. The control circuit, having received the detection signal, judges that "workpiece releasing is completed," and issues a command to send out the automotive vehicle body on which the workpiece has been welded, and to transport a next automotive vehicle body on which the workpiece is to be welded. In this manner, continuous welding of workpieces is carried out on the automotive vehicle bodies.

Naturally, in subsequent operations as well, similar to the aforementioned processes, entry and penetration of debris or foreign matter into the interior of the casing 32 can effectively be avoided.

Next, explanations will be made concerning an embodiment in which side surface cleaning scrapers are provided for cleaning side surfaces of the first arcuate portion 94. Constituent elements that are the same as those shown in FIGS. 1 through 6 are designated by like reference characters, and detailed descriptions of such features are omitted.

Figure 7:
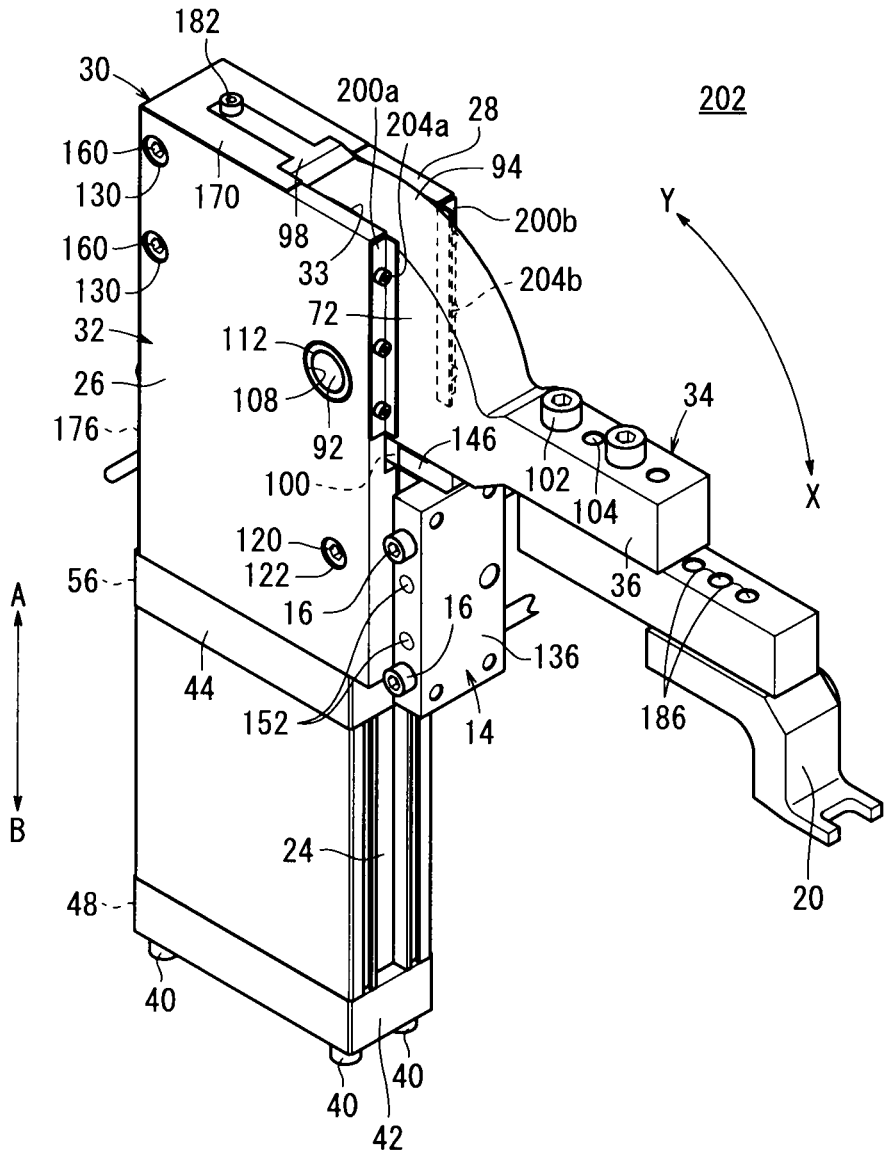
FIG. 7 is an overall outline perspective view of a clamp apparatus according to another embodiment.

FIG. 7 is an overall outline perspective view of a clamp apparatus 202 in which two third scrapers 200*a*, 200*b* (side surface cleaning scrapers) are provided, in addition to the first scraper 98 and the second scraper 100. Similar to the first scraper 98 and the second scraper 100, the third scrapers 200*a*, 200*b* are formed from thin metal plates, which exhibit elasticity and further exhibit a suitable elastic force.

In this case, the third scraper 200*a* includes a long side portion, and a short side portion, which is shorter compared to the long side portion, and which is bent at substantially 90° with respect to the long side portion forming an L-shape. The long side portion thereof is attached by screws 204*a* in the vicinity of the vertical mouth of the opening 33 in the first casing member 26. Further, one end surface of the short side portion is placed in sliding contact against the side surface on the first arcuate portion 94 of the clamp arm 34 that faces the first casing member 26.

The other third scraper 200*b* is constructed in the same manner as the aforementioned third scraper 200*a*. The long side portion thereof is attached by screws 204*b* in the vicinity of the vertical mouth of the opening 33 in the second casing member 28, and together therewith, one end surface of the short side portion is placed in sliding contact against the side surface on the first arcuate portion 94 of the clamp arm 34 that faces the second casing member 28.

Accordingly, in this case, during the process in which the clamp arm 34 is swung and oriented along the direction of the arrow X about the pivot pin 92 in order to clamp the workpiece together with the first arcuate portion 94 gradually being exposed from the casing 32, at the same time that the second scraper 100 is in sliding contact with the arcuate surface of the second arcuate portion 96, the first scraper 98 is in sliding contact with the arcuate surface of the first arcuate portion 94, and furthermore, the third scrapers 200*a*, 200*b* are placed in sliding contact respectively against side surfaces of the first arcuate portion 94. As a result, the first arcuate portion 94, both the arcuate surface and the side surfaces of which have been subjected to cleaning, is exposed from the casing 32. Accordingly, adherence of foreign matter to the arcuate surface and side surfaces of the first arcuate portion 94, and mixing of such foreign matter at welding locations can more reliably be avoided.

Further, during the process in which the clamp arm 34 is swung and oriented in the direction of the arrow Y about the pivot pin 92 in order to place the workpiece in an unclamped state, together with the first arcuate portion 94 being accommodated gradually inside the casing 32, the first scraper 98 is in sliding contact with the arcuate surface of the first arcuate portion 94, along with the third scrapers 200*a*, 200*b* being placed in sliding contact against the side surfaces. Moreover, at the same time, naturally, the second scraper 100 is kept in sliding contact with respect to the arcuate surface of the second arcuate portion 96.

Accordingly, when welding is carried out with respect to the workpiece, even if debris or foreign matter become adhered to the arcuate surface or the side surfaces of the first arcuate portion 94, such debris or foreign matter is scraped off by the first scraper 98 and the third scrapers 200*a*, 200*b*. Owing thereto, the arcuate surface and side surfaces of the first arcuate portion 94 can always be maintained in a clean condition.

Consequently, entry and penetration of debris or foreign matter that is adhered to the arcuate surface or the side surfaces of the first arcuate portion 94 into the interior of the casing 32 can be prevented. From this standpoint as well, the toggle link mechanism 70 can be protected from debris or foreign matter, and as a result, suitable operations of the toggle link mechanism 70, and hence suitable swinging movement of the clamp arm 34, can be maintained over a long period.

In addition, the third scrapers 200*a*, 200*b*, similar to the first scraper 98 and the second scraper 100, function as seals for blocking clearances between the casing 32 and the clamp arm 34. Owing thereto, since debris does not enter and penetrate into the interior of the casing 32, the toggle link mechanism 70 is prevented more easily from becoming contaminated.

In this manner, by additionally providing the third scrapers 200*a*, 200*b* that act to clean the side surfaces of the first arcuate portion 94, penetration of debris or foreign matter into the interior of the casing 32 can be avoided more easily.

The clamp apparatus according to the present invention is not limited by the aforementioned embodiments. It is a matter of course that various structures could be adopted therein without deviating from the essence and gist of the present invention.

For example, the first scraper 98 may be disposed on the inside of the casing 32, and the second scraper 100 may be disposed on the outside of the casing 32. Similarly, the third scrapers 200*a*, 200*b*, for example, may be made from rectangular shaped thin rubber sheets, and may be arranged at positions facing toward the side surfaces of the clamp arm 34 on inner walls of vertical mouth of the opening 33. In this case, the dimensions of the third scrapers 200*a*, 200*b* may be of a degree that does not interfere with swinging operations of the clamp arm 34.

Further, the first casing member 26 and the second casing member 28 can constitute the casing without being divided or separated from each other.

Figure 8:
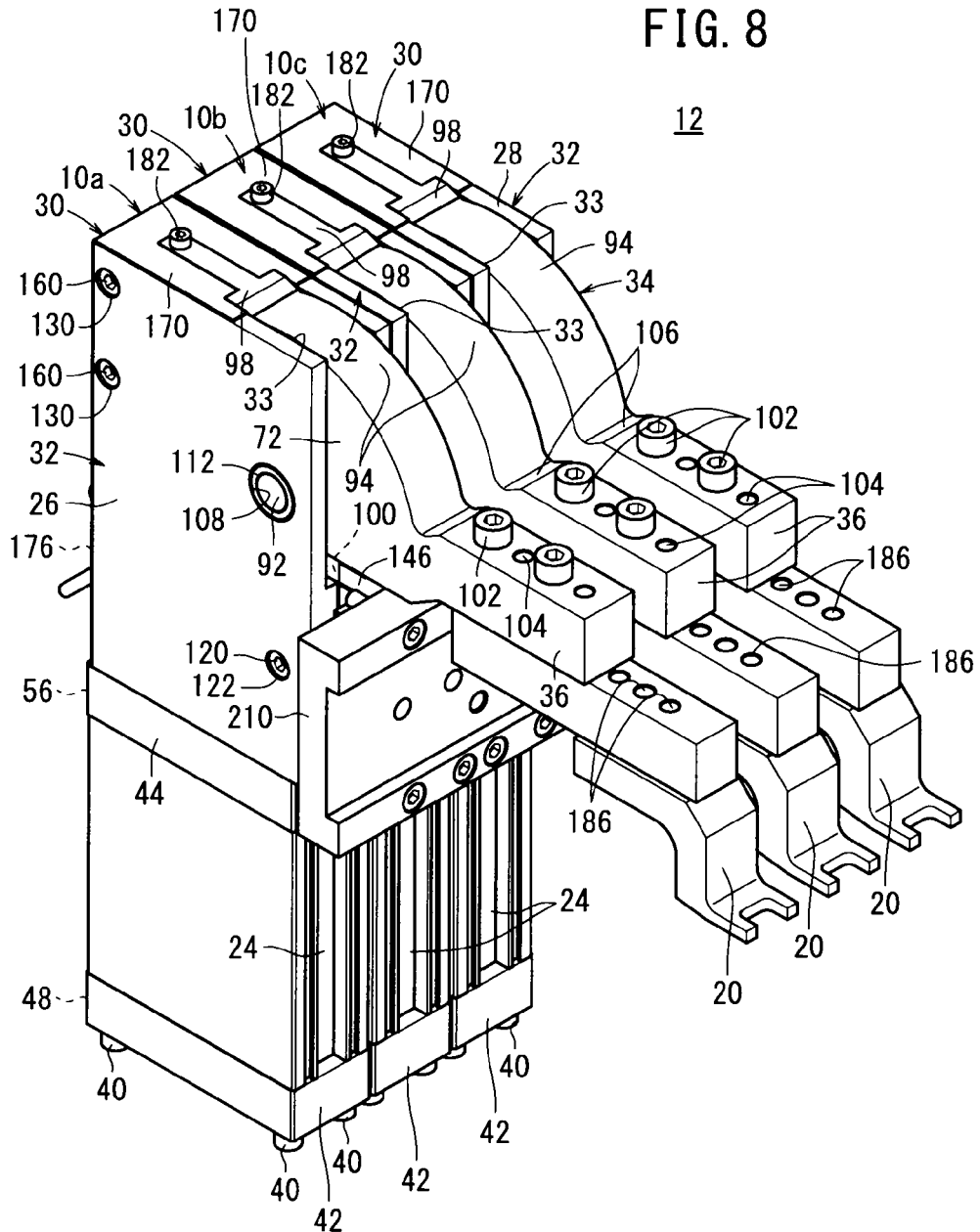
FIG. 8 is an overall outline perspective view of a clamp unit according to another embodiment.

Furthermore, the means for connecting the clamp apparatus 10*a* to 10*c* is not limited in particular to the connecting brackets 14 and the tie rods 16. As shown in FIG. 8, a single connecting plate 210 may be employed, which bridges over the clamp apparatus 10*a* to 10*c*. The clamp apparatus 202 shown in FIG. 7 may also be connected together as a plurality in a similar manner.

Still further, although in the embodiments shown in FIGS. 1 and 8, the clamp unit 12 is constituted by three individual clamp apparatus 10*a* to 10*c*, it goes without saying that the number of clamp apparatus is not limited to three. Naturally, the same is true also in the case of connecting together the clamp apparatus 202 shown in FIG. 7.

The invention claimed is:

1. A clamp apparatus comprising:
   a clamp arm, one end portion of which is exposed from an opening of a casing, and another end portion of which is accommodated inside the casing;
   a support shaft that pivotally supports the other end portion of the clamp arm at an interior of the casing;
   a cylinder having a rod that is connected to the clamp arm through a toggle link mechanism arranged in the interior of the casing, and which causes the clamp arm to swing about the support shaft by converting linear movement of the rod into rotational movement through the toggle link mechanism;
   a first scraper disposed on the casing:
   a second scraper that is separate from the first scraper and disposed on the casing separately from the first scraper,
   wherein an arcuate portion is formed on the clamp arm and is curved about the support shaft, and the arcuate portion is exposed to an exterior of the casing when the clamp arm swings so as to clamp a workpiece, whereas the arcuate portion is accommodated inside the casing when the clamp arm swings so as to release the workpiece,
   wherein another arcuate portion is formed on the clamp arm and is curved about the support shaft, and the other arcuate portion is accommodated inside the casing when the clamp arm swings so as to clamp the workpiece, whereas the other arcuate portion is exposed to the exterior of the casing when the clamp arm swings so as to release the workpiece,
   wherein the first scraper is in sliding contact against an arcuate surface of the arcuate portion when the clamp arm swings, and
   wherein the second scraper is in sliding contact against an arcuate surface of the other arcuate portion when the clamp arm swings.

2. The clamp apparatus according to claim 1, wherein the first scraper is disposed while being exposed on the exterior of the casing.

3. The clamp apparatus according to claim 1, wherein the first scraper functions as a seal.

4. The clamp apparatus according to claim 1, wherein the second scraper is disposed while being accommodated inside the casing.

5. The clamp apparatus according to claim 1, wherein the second scraper functions as a seal.

6. The clamp apparatus according to claim 1, wherein side surface cleaning scrapers, which are in sliding contact against side surfaces of the arcuate portion when the clamp arm swings, further are disposed on the casing.

7. The clamp apparatus according to claim 6, wherein the side surface cleaning scrapers function as seals.

8. The clamp apparatus according to claim 1, wherein a unit is capable of being constructed by connecting a plurality of the clamp apparatus in parallel such that respective clamp arms thereof are swingable in the same direction.

9. A clamp apparatus comprising:
   a casing;
   a clamp arm having a first end portion exposed from an opening of the casing, and a second end portion positioned on an inside of the casing;
   a support shaft that pivotally supports the second end portion at an interior of the casing;
   a toggle link mechanism arranged in the interior of the casing and connected to the clamp arm;
   a cylinder including a rod cover and a rod extending through the rod cover and connected to the toggle link mechanism;
   a bracket including a wide end and a narrow end that connects to the interior of the casing and extends along a longitudinal axis of the casing between the rod cover and the support shaft;
   a scraper mounted on a surface of the bracket;
   wherein the toggle link mechanism converts linear motion of the rod to rotational movement of the clamp arm so the clamp arm swings about the support shaft;
   wherein an arcuate portion that is curved about the support shaft and formed on the clamp arm is positioned inside the casing when the clamp arm swings so as to clamp a workpiece and exposed to an exterior of the casing when the clamp arm swings to release the work piece,
wherein the scraper is in sliding contact against an arcuate surface of the arcuate portion when the clamp arm swings.

10. The clamp apparatus according to claim 9, further comprising a fixed roller inside the casing,
wherein the toggle link mechanism includes:
a first link member attached to the rod, and
a second link member with a first end attached to the first end portion of the clamp arm and a second end attached to the first link member, and
wherein a curved end surface of the second end of the second link member abuts the fixed roller when the clamp arm swings.

11. The clamp apparatus according to claim 9, further comprising a stopper fixed on the surface of the bracket,
wherein the stopper restricts a movement of the clamp arm when the clamp arm swings so as to clamp the workpiece.

* * * * *